United States Patent
Rjaibi et al.

(10) Patent No.: US 6,732,110 B2
(45) Date of Patent: May 4, 2004

(54) ESTIMATION OF COLUMN CARDINALITY IN A PARTITIONED RELATIONAL DATABASE

(75) Inventors: Walid Rjaibi, Kilcherg (CH); Guy Maring Lohman, San Jose, CA (US); Peter Jay Haas, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 09/894,222

(22) Filed: Jun. 27, 2001

(65) Prior Publication Data

US 2002/0026438 A1 Feb. 28, 2002

(30) Foreign Application Priority Data

Aug. 28, 2000 (CA) .............................................. 2317081

(51) Int. Cl.[7] .............................................. G06F 17/00
(52) U.S. Cl. .................... 707/101; 707/102; 707/104.1; 707/2
(58) Field of Search .............................. 707/3, 2, 101, 707/202, 1–7, 100, 102, 104.1

(56) References Cited

U.S. PATENT DOCUMENTS

| | | | | |
|---|---|---|---|---|
| 5,469,568 A | | 11/1995 | Schiefer et al. | 395/600 |
| 5,542,073 A | | 7/1996 | Schiefer et al. | 395/600 |
| 5,761,653 A | | 6/1998 | Schiefer et al. | 707/2 |
| 5,765,146 A | * | 6/1998 | Wolf et al. | 707/2 |
| 5,797,000 A | * | 8/1998 | Bhattacharya et al. | 707/2 |
| 5,802,521 A | * | 9/1998 | Ziauddin et al. | 707/101 |
| 5,899,986 A | * | 5/1999 | Ziauddin | 707/2 |
| 5,918,225 A | | 6/1999 | White et al. | 707/3 |
| 6,029,163 A | * | 2/2000 | Ziauddin | 707/2 |
| 6,226,629 B1 | * | 5/2001 | Cossock | 707/3 |
| 6,405,198 B1 | * | 6/2002 | Bitar et al. | 707/6 |
| 6,421,687 B1 | * | 7/2002 | Klostermann | 707/202 |
| 6,477,523 B1 | * | 11/2002 | Chiang | 707/2 |

OTHER PUBLICATIONS

Deen et al "Multi–join on parallel processors", IEEE 1990, pp. 92–102.*
Poosala et al "Improved histograms for selectivity estimation of range predictes", ACM 1996, pp. 294–305.*
Astrahan, Morton M., "Approximating the Number of Unique Values of an Attribute Without Sorting," Inform. Systems, 1987, vol. 12, No. 1, pp. 11–15.

* cited by examiner

Primary Examiner—Uyen Le
(74) Attorney, Agent, or Firm—Sawyer Law Group LLP

(57) ABSTRACT

The present invention is directed to a system, method and computer readable medium for estimating a column cardinality value for a column in a partitioned table stored in a plurality of nodes in a relational database. According to one embodiment of the present invention, a plurality of column values for the partitioned table stored in each node are hashed, and a hash data set for each node is generated. Each of the hash data sets from each node is transferred to a coordinator node designated from the plurality of nodes. The hash data sets are merged into a merged data set, and an estimated column cardinality value for the table is calculated from the merged data set.

24 Claims, 1 Drawing Sheet

ESTIMATION OF COLUMN CARDINALITY IN A PARTITIONED RELATIONAL DATABASE

FIELD OF THE INVENTION

The present invention is directed to an improvement in computing systems and in particular to an improved system for the estimation of column cardinality in a partitioned relational database.

BACKGROUND OF THE INVENTION

In relational database management systems (RDBMS) it is common to utilize query optimizers to improve the efficiency of processing of queries to be carried out on a relational database. One of the most commonly required statistics for such query optimisation is the column cardinality for a table in a relational database. Column cardinality is the number of distinct values contained in a column in the table of the database. In a serial database, column cardinality may be calculated relatively easily if an index is defined on the column being considered. Where there is no index on a column for which the cardinality is to be calculated, a sort of the values in the column is required to provide an exact measurement. Such sorting is an expensive operation and is not desirable in a database system. Because query optimisers do not require exact statistics to function effectively, a good approximation of column cardinality is sufficient in most cases to obtain a good query plan.

There are a number of techniques known in the prior art to obtain approximations for column cardinality without requiring the sorting of column values in a database table. Examples of such prior art techniques include sample counting, linear counting, and logarithmic counting. These techniques are described in Morton M. Astrahan, Mario Schkolnick, and Kyu-Young Whang, "Counting Unique Values of an Attribute Without Sorting," Information Systems 12, 1(1987).

In a partitioned RDBMS, such as a share-nothing parallel database management system, tables may be partitioned across several nodes which do not share data. In such an environment it is potentially difficult to calculate column cardinality. The same value may occur in multiple nodes and therefore it is not possible to simply sum the column cardinality values for each node to obtain a table's overall column cardinality value for the different nodes in the parallel database. One approach is used in the DB2 universal database (UDB) (trade-mark) in the parallel database environment. This approach relies on statistics for column cardinality being calculated on a single node. The node used will be treated as being representative of the data in the column across the different nodes in the partitioned database. In fact, the node may or may not be representative of the data as a whole. As a query is optimised, the overall column cardinality (across all nodes) is estimated using a known probabilistic formula. The column cardinality for the representative node, the number of table rows in that node, and the number of nodes across which the table is partitioned are used to estimate the overall column cardinality. There is overhead involved in such an approach, and the approach is also limited where the node used to represent the data as a whole is in some way atypical of the data value distribution. As a result the estimated overall column cardinality using this approach may vary considerably from the actual value.

It is therefore desirable to have a technique for estimating the cardinality of a column in a partitioned relational database table which is efficient and which provides a reliable estimate of the column cardinality across all nodes in which the table data is stored.

SUMMARY OF THE INVENTION

A system, method and computer readable medium for estimating a column cardinality value for a column in a partitioned table stored in a plurality of nodes in a relational database is disclosed. According to one embodiment of the present invention, a plurality of column values for the partitioned table stored in each node are hashed, and a hash data set for each node is generated. Each of the hash data sets from each node is transferred to a coordinator node designated from the plurality of nodes. The hash data sets are merged into a merged data set, and an estimated column cardinality value for the table is calculated from the merged data set.

Advantages of the invention include an efficient technique for providing a reliable estimate of column cardinality in a partitioned relational database.

Figure 1:
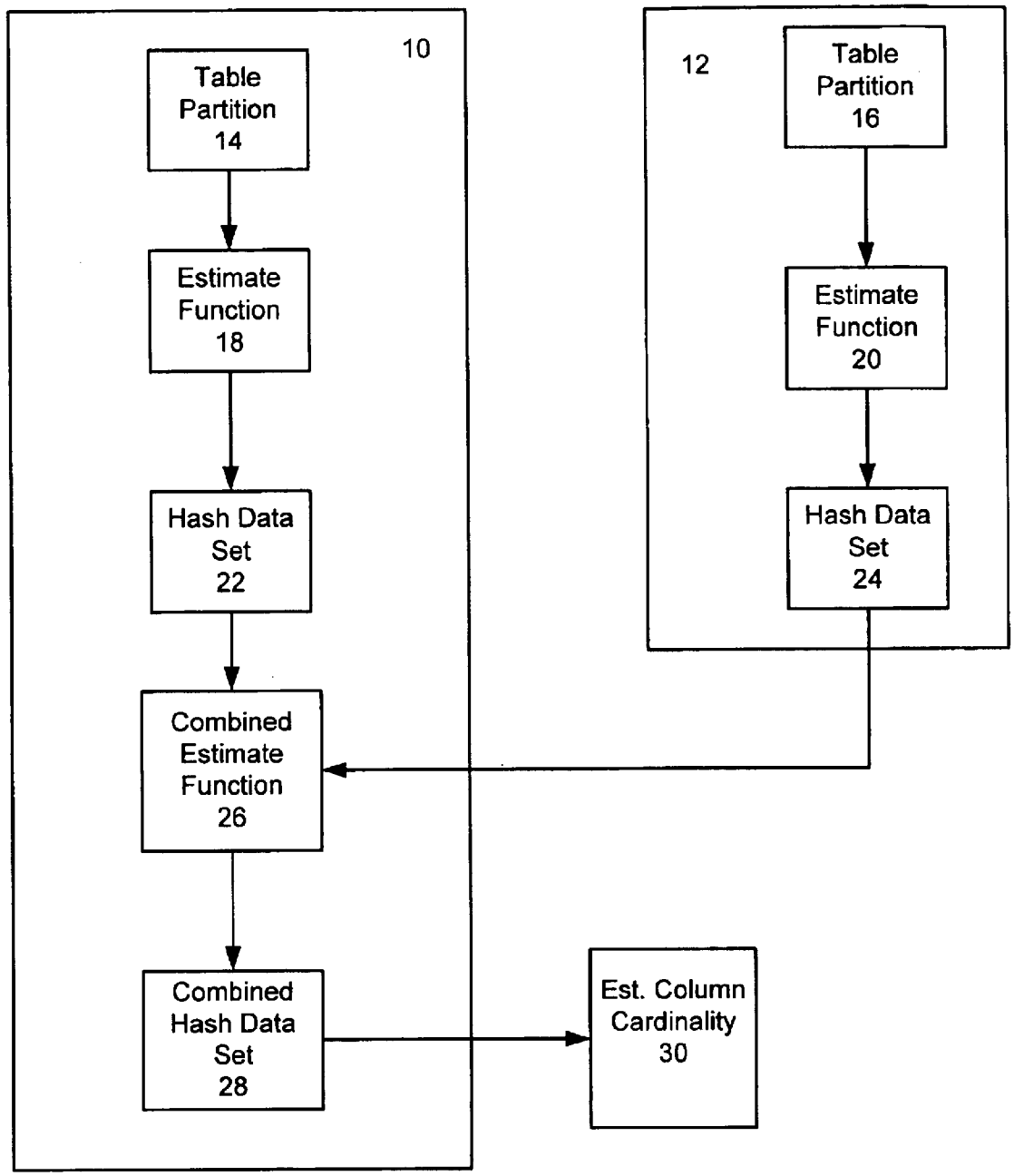
FIG. 1 is a block diagram illustrating example nodes in a database in accordance with the preferred embodiment of the invention.

In the drawing, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

FIG. 1 illustrates, in a block diagram, two example nodes of a partitioned database used to demonstrate the estimation of column cardinality according to the preferred embodiment. Node 10 and node 12 are shown, containing table partitions 14, 16, respectively. The table in the partitioned database is partitioned between the nodes 10, 12. In the block diagram of FIG. 1, node 10 is shown containing estimate function 18 and node 12 containing estimate function 20. Node 10 further contains hash data set 22 and similarly, node 12 contains has data set 24.

According to the preferred embodiment, an initial step of a column cardinality estimation technique is carried out in each of nodes 10, 12 by estimate functions 18, 20, all shown in FIG. 1. Each of estimate functions 18, 20 generate hash data sets 22, 24, respectively. In the preferred embodiment illustrated in FIG. 1, node 10 is shown as a coordinating node which uses combined estimate function 26 to create combined hash data set 28, and the estimated column cardinality value for the table made up of table partitions 14, 16.

In the preferred embodiment, estimate functions 18, 20 and combined estimate function 26 collectively generate the estimated column cardinality value using a selected one of the known techniques of sample counting, linear counting or logarithmic counting. The most appropriate of these known techniques may be selected for use in a given query optimizer in an RDBMS based on requirements and system resources available. The manner in which each of the three techniques is implemented in the preferred embodiment is set out below.

Where a sample counting technique is used, a hash function is applied to each data value of the column and a list of hash values is maintained (H list). Subsequent hash values are compared to those contained in the H list and are added to the H list if not present. In practice, the H list is maintained such that there is filtering of hash values before entry into the H list. A sampling parameter K and a reference pattern are used. The values to be entered into the H list must have K bits that exactly match the corresponding K bits of the reference pattern. Initially K is set to 0 (all hash values are entered in the H list). When the H list becomes full, the value of K is increased and the H list is purged of all hash values that do not match the reference pattern to K bits. The reference pattern is typically a string of one values of a length K.

As will be apparent, the size of the H list is effectively reduced by half on each increase of the value of K. The column cardinality is found by multiplying the final length of the H list by two to the power $K(2^K)$. The column cardinality is then corrected to allow for hash function collisions with a known adjustment formula derived using probabilistic arguments known to those skilled in the art.

In the examples shown in FIG. 1, the hash data set 22 generated by estimate function 18 includes the H list and the related K value. A similar H list with associated K value is calculated by estimate function 20 in node 12 and is shown as hash data set 24 structure in FIG. 1. In the preferred embodiment, after hash data sets 22, 24 are generated, hash data set 24 is sent to node 10 (the coordinator node). It will be understood by those skilled in the art that the parallel nature of the RDBMS described enables node 10 to be selected as the coordinator node. In other embodiments it may be desirable to process the hash data sets by using a process distinct from the nodes in the parallel database.

In the preferred embodiment illustrated in FIG. 1, the coordinator node (node 10) computes the overall column cardinality for the two nodes shown in FIG. 1. Node 10 receives hash data set 24 and merges that data set with hash data set 22 to generate combined hash data set 28. It will be appreciated by those skilled in the art that although FIG. 1 shows combined hash data set 28 as a distinct data structure, the merger may occur by one of the existing hash data sets being extended to include the other. As is described in more detail below, the merger of the hash data sets will depend on the column cardinality estimation technique being used in estimate functions 18, 20 and in combined estimate function 26. Once the merger of the hash data value set is carried out, combined estimate function 26 carries out a counting and correction step, as is described in more detail below. The result is the estimated column cardinality value for the table.

A comparison is carried out in node 10 to determine which of the hash data sets (22, 24) has the highest K value. This hash data set is used as a starting point (primary data structure) and the values in the H list of the hash data set (secondary data structure) are treated as candidates to be entered into the H list of the primary data structure. The resultant merged data is shown in FIG. 1 as combined hash data set 28. The overall column cardinality is calculated once all values of the secondary H list have been added to the primary H list. This is done by multiplying the final length of the primary H list by two, raised to the power of the final sampling parameter in the primary data structure. The column cardinality estimate for the entire partitioned table is then corrected to allow for hash function collisions, as referred to above.

It is also possible to carry out the above technique for multiple nodes. It is possible to incrementally update the combined hash data set 28 by serially receiving estimate data structures from such multiple nodes. The values in each data structure are transferred to the coordinating node to create the combined estimate data structure in the manner described above. This process is continued until all data structure estimates are received from all nodes in the database.

In the sample counting technique implementation of the preferred embodiment, the hash data sets from other nodes are received in the coordinator node and are maintained in a queue for processing. A combined hash data set sampling parameter K' initially set to zero and, until the first hash data set arrives from another node, the value of K' is set by the coordinator node in the manner described above as it generates a hash data set using the sample counting technique locally. When other hash data set elements are in the queue for processing, the combined hash data set sampling parameter K' is increased and the global H-List is purged whenever:

1. The combined hash data set reaches a maximum defined size, in which case K' is increased by 1, one purge is executed and the number of masking bits in the reference pattern is increased by 1; or
2. The sampling parameter K of an incoming hash data set from another node is larger than the value of K', in which case (K–K') purges are executed on the combined hash data set, the number of masking bits in the reference pattern is increased by (K–K'), and K' is set to the value of K.

The column cardinality for the table is obtained by multiplying the final length of the combined hash data set by 2 raised to the power K' and this product is then corrected for hash-function collisions, as described above and known in the art.

In an alternative implementation, a different estimate technique is used in the nodes and in the calculation of a column cardinality estimate for the entire table (across all nodes containing partitioned portions of the table). Instead of using the sample counting technique described above, a linear counting technique may be used. This linear counting technique is known in the art and is referred to in Astrahan, et al., above.

In this implementation of the preferred embodiment, the linear counting technique is carried out on each node. According to the linear counting technique, a bit vector is produced. The linear counting technique hashes each value of the column in the node to a bit position in a bit vector. The vector is initially set to be all 0's. Where the data in the node in question has a given value, the corresponding bit in the bit vector is set to 1. When all values in the column in the node have been hashed into the bit vector, the number of distinct values may be derived by counting the number of bits that are set to 1, and adjusting the count with an adjustment formula, derived using probabilistic arguments, to allow for collisions (distinct values in the column that hash to the same location).

The linear counting technique is used in the alternative embodiment as follows. The linear counting technique is carried out at each of the nodes in the database (in the example of FIG. 1, nodes 10, 12). Each node is constrained to use the same hashing algorithm and the same-sized bit vector in carrying out the linear counting technique. When all column values have been hashed on a node, and without further processing of the bit vector at that node, the bit vector is sent to a single coordinator node for that column (node 10 in the example of FIG. 1). The coordinator node then performs a logical inclusive OR on each bit vector together into a single bit vector. The OR-ing of the N bit vectors is carried out bit-wise: for each bit position L in the resultant bit vector R, the value is a 1 if and only if the value is 1 in one or more of the input bit vectors. Once a combined bit vector is calculated (combined estimate 22 in FIG. 1), the known steps are carried out to determine the estimate for column cardinality for the database as a whole.

As with the sample counting variant, the bit vector for the database may be incrementally constructed by logically OR-ing the combined estimate bit vector with bit vectors from different nodes in the database as they are received by the coordinating node.

A further implementation of the preferred embodiment involves the use of the logarithmic counting technique known to those skilled in the art (see Astrahan et al., above). The logarithmic counting technique is used on each node, producing a bit map for each column on each node. The details of the logarithmic counting technique are as follows. For each data value in a column in a node, a binary hash value is calculated. Each binary hash value is then transformed by a function which leaves only the leftmost '1' bit in the binary value unchanged, all other bits being set to zero. Each transformed value is then OR-ed into the bit map for the node. When all data values of the columns have been processed, the estimate for number of distinct values in the column is calculated by dividing 2 raised to the power n by q, where n is the position of the leftmost '0' bit in the bit map, starting with zero on the left, and q is a parameter specified by the size of the bit map used. For example, q 0.7735 when a 32-bit map is used. The values of q for different sized bit-maps are known to those skilled in the art.

The logarithmic counting technique is used, in this implementation of the preferred embodiment, at each of the nodes in the database. The technique is constrained to use the same hashing algorithm, the same transformation function, and the same-sized bit-map at each node. When all data values have been processed on a node, the resultant bit map is sent to a single coordinator node for that column. The coordinator node carries out a logical (inclusive) OR of the bit-maps (in a bit-wise fashion). The result is a bit-map for the database as a whole. The technique of logarithmic counting is then carried out on this combined database to calculate an estimate for the column cardinality of the entire database.

As with the sample counting and linear counting approaches described above, the logical OR-ing of the bit-maps in the coordinator node does not need to wait until all bit maps have been received. The bit-map for the table may be incrementally defined.

As may be seen from the above description, in the preferred embodiments of the invention, a merge step is carried out in the coordinating node (node 10 in the example of FIG. 1). Where column cardinality for different columns is estimated to assist in query optimization, it is possible to improve the techniques set out above using parallelization. In the merge step described above, the coordinator node computes the overall column cardinality for the C columns of a given table in a sequential manner, and that the other nodes are idle during this time. For a table T with C columns C1, C2, . . . , Cc, the computation of the column cardinality for column Ci, is independent from the computation of the column cardinality for another column Cj,. It is possible to assign the computation of the merging step for each column to a different node, thereby computing that step for different columns, in parallel.

To achieve this parallelization, a plurality of nodes will be identified as coordinator nodes, and each column is assigned to one of these nodes. The estimate data structures will be sent to the appropriate node as defined by the column assignments. The process of identifying the plurality of nodes which will participate in the final steps of the technique is carried out based on the total number of nodes across which the table is partitioned and the total number of columns in the table. If the number of columns is greater than the number of nodes, then all the nodes are eligible to participate in the merge phase. Each node will compute the overall column cardinality for an average of C/N columns, where C is the number of columns in the table and N is the total number of nodes across which the table is partitioned.

However, if the number of columns is less than or equal to the number of nodes across which the table is partitioned, then only C<=N nodes are eligible to participate in the final step of the algorithm. Each of the C nodes computes the overall column cardinality for one column of the table. Where maximum parallelization is not required, other approaches to assigning coordinator nodes may be used.

Although a preferred embodiment of the present invention has been described here in detail, it will be appreciated by those skilled in the art, that variations may be made thereto, without departing from the spirit of the invention or the scope of the appended claims.

What is claimed is:

1. A method for estimating a column cardinality value for a column having a plurality of values in a partitioned table stored in a plurality of nodes in a relational database, the method comprising the steps of:
   (a) generating a respective hash data set for each node in the plurality of nodes by hashing the column values for the partitioned table stored in each node wherein the hash data set comprises a list of unique hash values;
   (b) transferring each of the hash data sets from each node in the plurality of nodes to a coordinator node;
   (c) merging each of the respective hash data sets into a merged data set, and
   (d) calculating an estimated column cardinality value for the table from the merged data set.

2. The method of claim 1, wherein the coordinator node is designated from the plurality of nodes.

3. The method of claim 1, wherein the calculating step (d) further comprising:
   (d1) counting and adjusting the merged data set to derive the estimate for the column cardinality for the table.

4. The method of claim 1, wherein the method utilizes a sample Counting technique.

5. The method of claim 4, wherein the generating step (a) further comprising:
   (a1) applying a defined hashing function to the plurality of column values for the partitioned table stored in the node, and generating a list of hash values and a sampling parameter for each node, a hash value being added to the list of hash values after filtering using a reference pattern defined by the sampling parameter, the sampling parameter being increased when the list of hash values reaches a predetermined maximum length.

6. The method of claim 5, wherein the transferring step (b) further comprising:
   (b1) transferring each list of hash values and the related sampling parameter from each node in the plurality of nodes to a coordinator node designated from the plurality of nodes.

7. The method of claim 5, wherein the merging step (c) further comprising:
   (c1) merging each list of hash values into a merged list of hash values by selecting a list of hash values having a largest associated sampling parameter and merging the each of the other lists into the selected list of hash values using filtering and sampling parameter incrementation as defined for sample counting.

8. The method of claim 7, wherein the calculating step (8) further comprising:
(d1) multiplying a length of the merged list of hash values by 2 raised to a power of the sampling parameter for the merged list of hash values; and
(d2) correcting the estimate to account for hash function collisions.

9. A computer readable medium containing programming instructions for estimating a column cardinality value for a column having a plurality of values in a partitioned table stored in a plurality of nodes in a relational database, the programming instructions for:
(a) generating a respective hash data set for each node in the plurality of nodes by hashing the column values for the partitioned table stored in each node wherein the hash data set comprises a list of unique hash values;
(b) transferring each of the hash data sets from each node in the plurality of nodes to a coordinator node;
(c) merging each of the respective hash data sets into a merged data set, and
(d) calculating an estimated column cardinality value for the table from the merged data set.

10. The computer readable medium of claim 9, wherein the coordinator node is designated from the plurality of nodes.

11. The computer readable medium of claim 9, wherein the calculating instruction (d) further comprising:
(d1) counting and adjusting the merged data set to derive the estimate for the column cardinality for the table.

12. The computer readable medium of claim 9, wherein a sample counting technique is utilized.

13. The computer readable medium of claim 12, wherein the hashing-generating instruction (a) further comprising:
(a1) applying a defined hashing function to the plurality of column values for the partitioned table stored in the node, and generating a list of hash values and a sampling parameter for each node, a hash value being added to the list of hash values after filtering using a reference pattern defined by the sampling parameter, the sampling parameter being increased when the list of hash values reaches a predetermined maximum length.

14. The computer readable medium of claim 13, wherein the transferring instruction (b) further comprising:
(b1) transferring each list of hash values and the related sampling parameter from each node in the plurality of nodes to a coordinator node designated from the plurality of nodes.

15. The computer readable medium of claim 13, wherein the merging instruction (c) further comprising:
(c1) merging each list of hash values into a merged list of hash values by selecting a list of hash values having a largest associated sampling parameter and merging the each of the other lists into the selected list of hash values using filtering and sampling parameter incrementation as defined for sample counting.

16. The computer readable medium of claim 15, wherein the calculating instruction (d) further comprising:
(d1) multiplying a length of the merged list of hash values by 2 raised to a power of the sampling parameter for the merged list of hash values; and
(d1b) correcting the estimate to account for hash function collisions.

17. A method for estimating a column cardinality value for a column having a plurality of values in a partitioned table stored in a plurality of nodes in a relational database, the method comprising the steps of:
(a) utilizing a logarithmic counting technique to generate a respective bit map for each node in the plurality of nodes by hashing the column values for the partitioned table stored in each node, wherein the utilizing step further includes:
(a1) calculating a binary hash value for each of the plurality of column values.
(b) transferring each bit map generated in each node in the plurality of nodes to a coordinator node designated from the plurality of nodes;
(c) merging each bit map in the coordinator node into a merged bit map by executing a logical, bit-wise OR operation on the bit maps; and
(d) calculating an estimated column cardinality value for the table from the merged bit map.

18. The method of claim 17, wherein the utilizing step (a) further comprises:
(a2) transforming each binary hash value by retaining a leftmost 1 bit in the binary hash value and replacing all other 1 bits in the binary hash value with 0 values; and
(a3) performing a logical OR operation on the transformed binary hash value with a bit map value for the column in the node.

19. The method of claim 17, wherein the calculating step (d) further comprising:
(d1) dividing 2 raised to a power of the leftmost position of a 0 bit in the merged bit map by a defined parameter related to a size of the bit map, and
(d2) correcting the estimate to account for hash function collisions.

20. A computer readable medium containing programming instructions for estimating a column cardinality value for a column having a plurality of values in a partitioned table stored in a plurality of nodes in a relational database, the programming instructions for:
(a) utilizing a logarithmic counting technique to generate a respective bit map for each node in the plurality of nodes by hashing the column values for the partitioned table stored in each node, wherein the utilizing instruction further includes:
(a1) calculating a binary hash value for each of the plurality of column values.
(b) transferring each bit map generated in each node in the plurality of nodes to a coordinator node designated from the plurality of nodes;
(c) merging each bit map in the coordinator node into a merged bit map by executing a logical, bit-wise OR operation on the bit maps; and
(d) calculating an estimated column cardinality value for the table from the merged bit map.

21. The computer readable medium of claim 20, wherein the utilizing instruction (a) further comprises:
(a2) transforming each binary hash value by retaining a leftmost 1 bit in the binary hash value and replacing all other 1 bits in the binary hash value with 0 values; and
(a3) performing a logical OR operation on the transformed binary hash value with a bit map value for the column in the node.

22. The computer readable medium of claim 20, wherein the calculating instruction (d) further comprising:
(d1) dividing 2 raised to a power of the leftmost position of a 0 bit in the merged bit map by a defined parameter related to a size of the bit map, and (d2) correcting the estimate to account for hash function collisions.

23. A method for estimating a column cardinality value for a column having a plurality of values in a partitioned table stored in a plurality of nodes in a relational database, the method comprising the steps of:
  (a) utilizing a sample counting technique to generate a respective list of hash values for each node in the plurality of nodes by hashing the column values for the partitioned table stored in each node, wherein hash values in the list are filtered when the list exceeds a predetermined length;
  (b) transferring each of the list of hash values from each node in the plurality of nodes to a coordinator node;
  (c) merging each of the respective lists of hash data values into a merged list, and
  (d) calculating an estimated column cardinality value for the table from the merged list.

24. A computer readable medium containing programming instructions for estimating a column cardinality value for a column having a plurality of values in a partitioned table stored in a plurality of nodes in a relational database, the programming instructions for:
  (a) utilizing a sample counting technique to generate a respective list of hash values for each node in the plurality of nodes by hashing the column values for the partitioned table stored in each node, wherein hash values in the list are filtered when the list exceeds a predetermined length;
  (b) transferring each of the list of hash values from each node in the plurality of nodes to a coordinator node;
  (c) merging each of the respective lists of hash data values into a merged list, and
  (d) calculating an estimated column cardinality value for the table from the merged list.

* * * * *

UNITED STATES PATENT AND TRADEMARK OFFICE
CERTIFICATE OF CORRECTION

PATENT NO. : 6,732,110 B2
DATED : May 4, 2004
INVENTOR(S) : Walid Rjaibe et al.

It is certified that error appears in the above-identified patent and that said Letters Patent is hereby corrected as shown below:

Column 6,
Line 44, remove "Counting" and replace with -- counting --.

Column 7,
Line 4, remove "(8)" and replace with -- (d) --.
Line 36, remove "hashing-".

Signed and Sealed this

Fourteenth Day of September, 2004

JON W. DUDAS
*Director of the United States Patent and Trademark Office*